May 17, 1960 F. R. MAZZITELLI 2,936,968
CONVERTIPLANE CONTROL SYSTEM
Filed Aug. 14, 1957 3 Sheets-Sheet 1

F. R. MAZZITELLI
INVENTOR.

BY
ATTORNEY

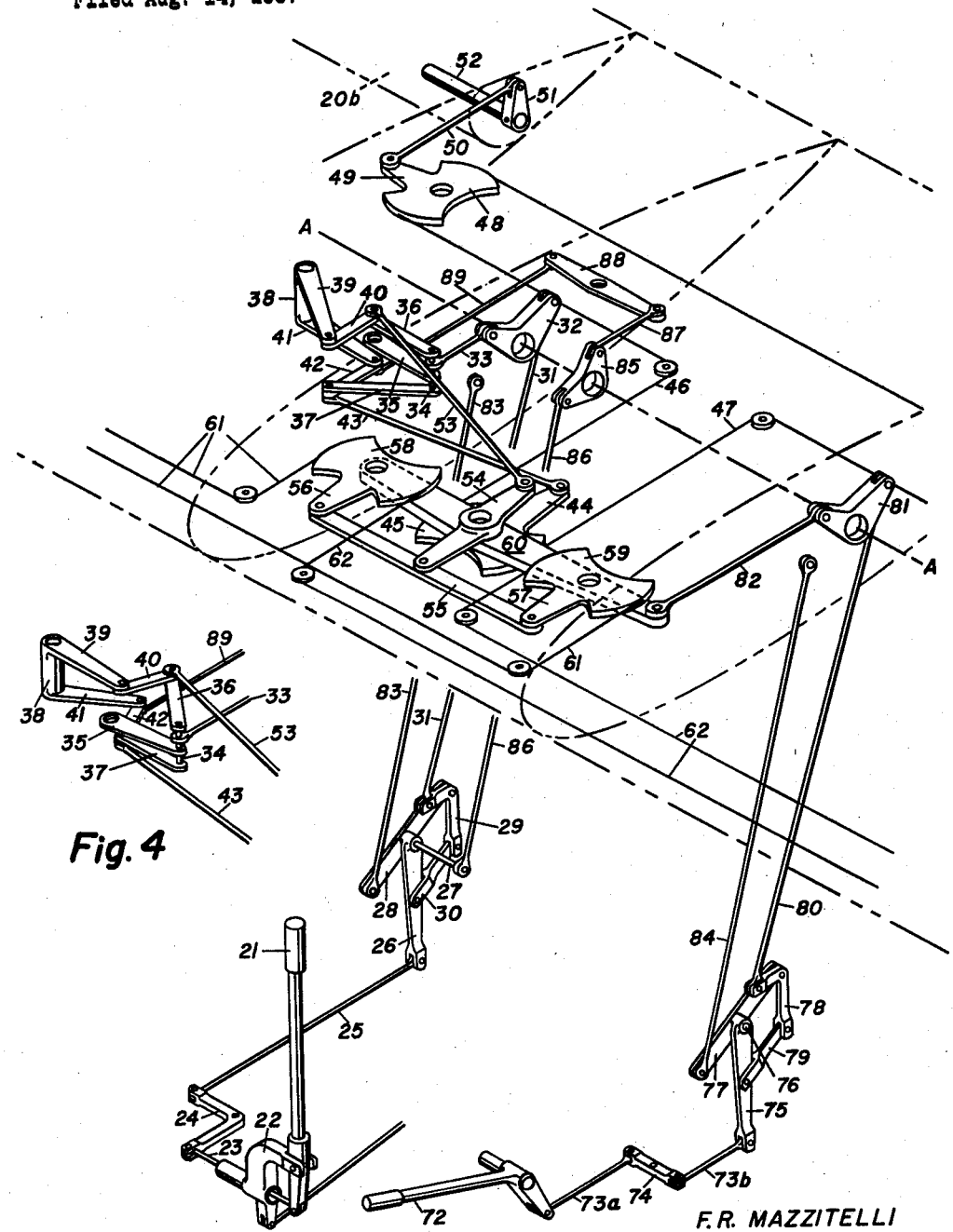

May 17, 1960 F. R. MAZZITELLI 2,936,968
CONVERTIPLANE CONTROL SYSTEM
Filed Aug. 14, 1957 3 Sheets-Sheet 3

F. R. MAZZITELLI
INVENTOR.

BY
ATTORNEY

United States Patent Office 2,936,968
Patented May 17, 1960

2,936,968

CONVERTIPLANE CONTROL SYSTEM

Frederick R. Mazzitelli, Springfield, Pa., assignor to Vertol Aircraft Corporation, Morton, Pa., a corporation of Pennsylvania Application August 14, 1957, Serial No. 678,759

3 Claims. (Cl. 244—7)

This invention relates to convertiplanes and more particularly to a convertiplane of the tilting wing type, and embodies certain improvements in the control system therefor as covered by the copending application of Paul J. Dancik, Serial Number 632,617, filed December 28, 1956, for Convertiplane.

It is an object of the present invention to utilize conventional ailerons for roll control of the aircraft in normal airplane flight, during which time the controls for hovering and/or vertical flight may or may not be functioning. It is a further object to provide variable thrust producing means on both sides of the longitudinal axis of the aircraft for propulsive thrust during airplane flight and for lifting thrust and roll control of the aircraft during hovering and vertical flight. It is a still further object to provide the normal aircraft control stick with means to control the lifting thrust producing means for roll control of the aircraft during hovering and vertical flight by lateral displacement of said control stick. A still further object is to provide means for "washing-out" the hovering and vertical flight control means during airplane flight.

When the wing is in the position for hovering and vertical flight, and the variable thrust producing means are differentially varied to provide the aforementioned roll control, there results a difference in airflow over the wing. This in turn results in an unbalance in the aerodynamic forces acting normal to the wing which causes the aircraft to turn to the right or to the left. Accordingly, it is the primary object of the present invention to provide means for eliminating such undesirable yawing tendencies. It is a further object to provide means for actuating the ailerons simultaneously with the thrust control means to balance said aerodynamic forces and thereby eliminate all tendencies of the aircraft to yaw during rolling maneuvers.

Other objects and advantages of the invention will become apparent from the following description taken in conjunction with the accompanying drawings in which.

Figure 3B:
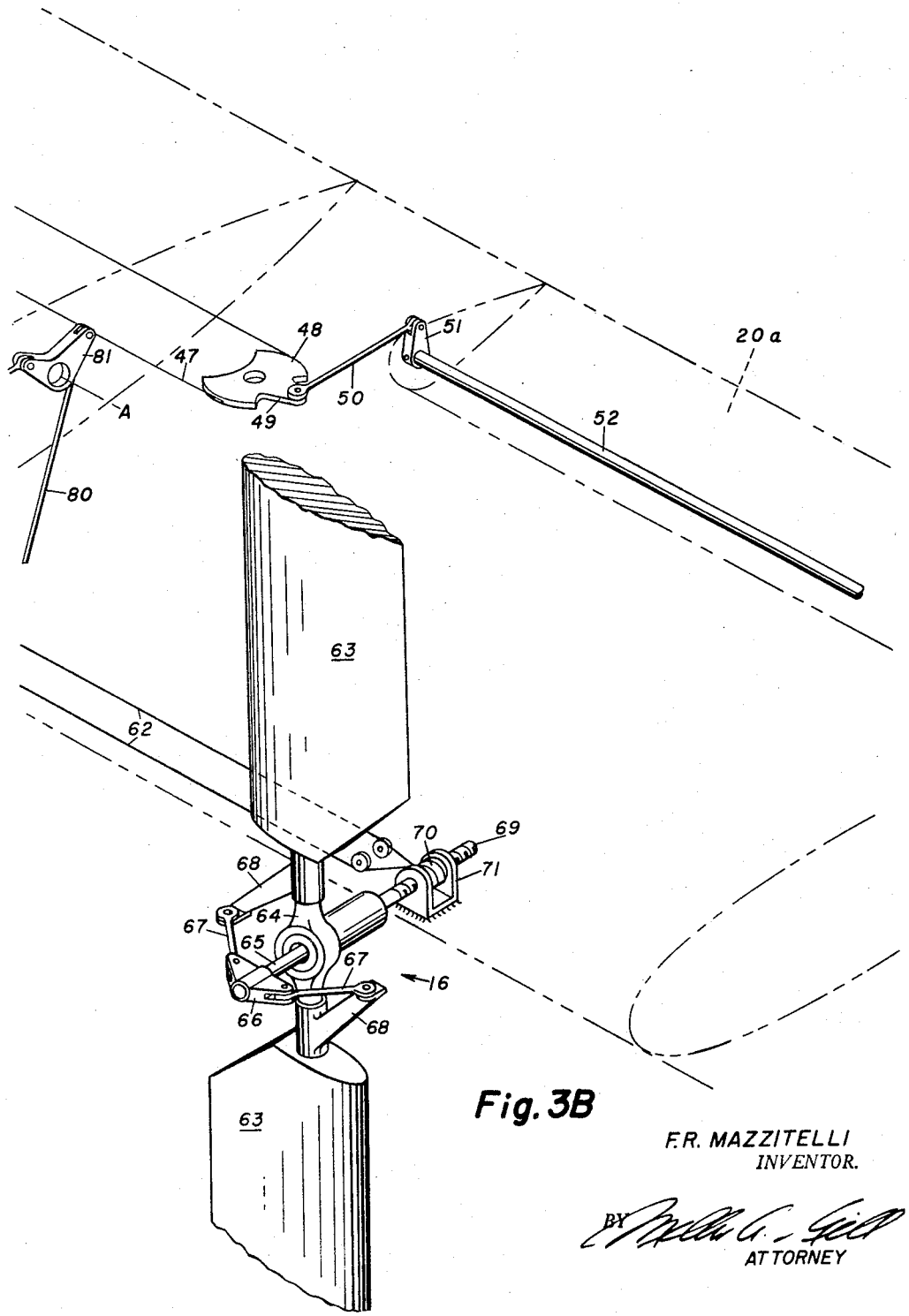

Figs. 3A and 3B combined form a diagrammatic perspective view of the flight control system; and Fig. 4 is a perspective view of the aileron-propeller pitch control changeover mechanism in the hovering and vertical flight position.

Figure 1:
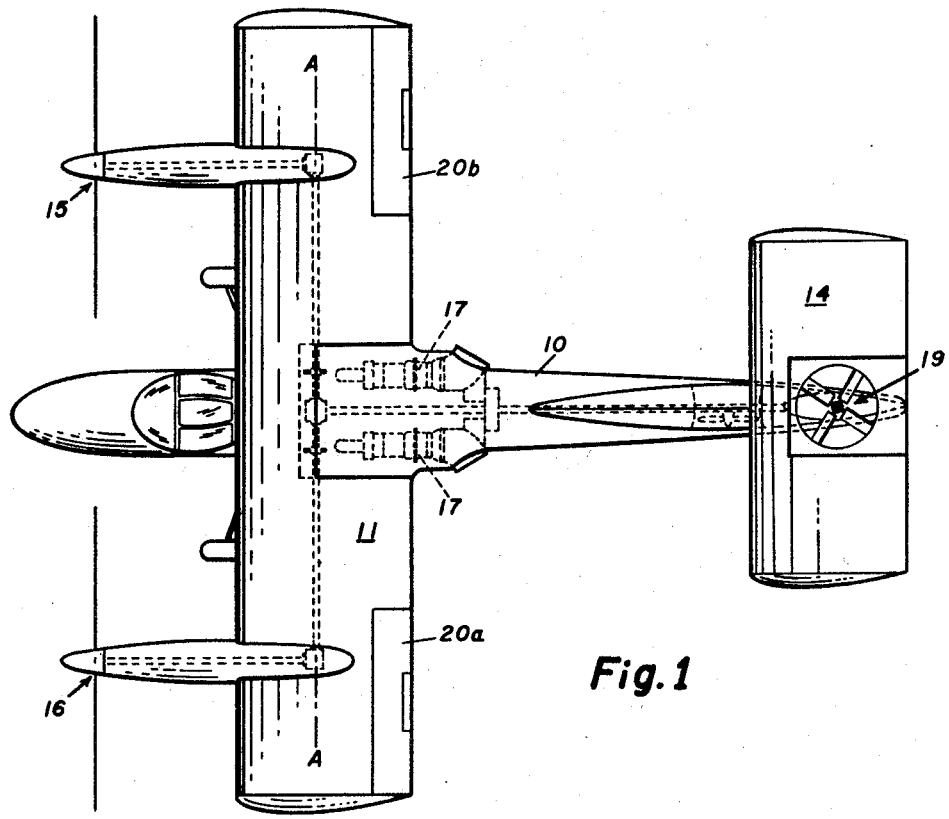
Fig. 1 is a plan view of an aircraft embodying the invention and illustrating the wing and propeller systems thereof in position for normal airplane flight.
Figure 2:
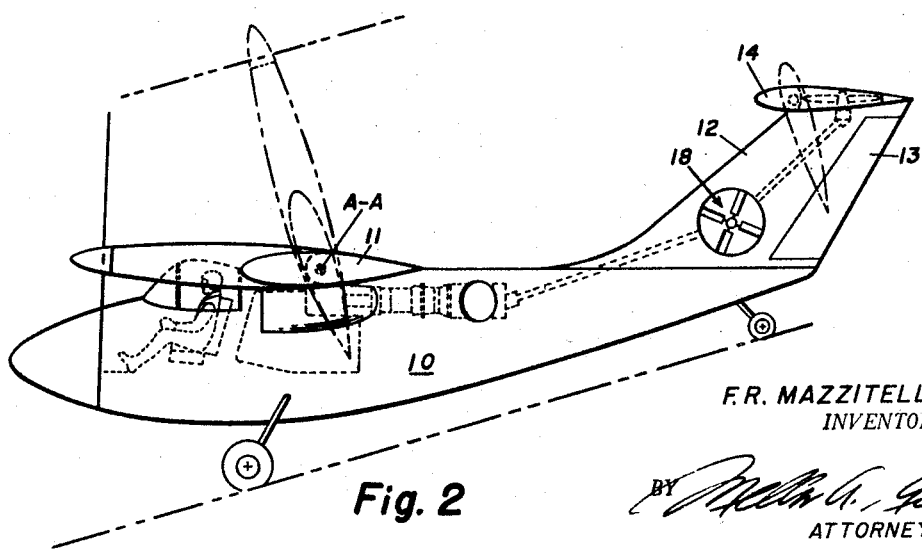
Fig. 2 is a side elevation of the aircraft showing in dotted lines the position of the wing and propeller systems for hovering and vertical flight.

As shown in Figs. 1 and 2, the aircraft consists of a fuselage 10 having a wing 11 pivotally attached thereto for rotation about an axis A—A and being provided with an empennage including a vertical fin 12, a rudder 13 and an elevator 14. The wing 11 is provided with ailerons 20a and 20b and carries starboard and port thrust producing means such as propellers 15 and 16, which propellers are driven through associated gearing and shafting by an engine or engines 17. The engine or engines also drive vertically and horizontally directed thrust producing means such as fans 18 and 19 which are carried by the empennage and are mounted for yaw and pitch control respectively.

Referring now to Figs. 3A and 3B, the pilot's control stick 21 is pivotally mounted for lateral movement on a bracket member 22 which in turn is journalled in bearings for rotation about a transverse axis. A link 23 extends through the hollow shaft portion of the bracket member 22 and is attached at one end to the lower end of the pilot's control stick 21 and at the other end to a bellcrank 24. A link 25 is attached to the other arm of the bellcrank 24 and is connected at its other end to a lever 26 pivotally mounted on fuselage structure by means of a pin 27. A lever 28, also pivotally mounted on fuselage structure by means of the pin 27, pivotally supports a bellcrank 29. A link 30 connects lever 26 with one arm of bellcrank 29 while a link 31 connects the other arm of the bellcrank 29 with a bellcrank 32 loosely supported on the wing tilt axis A—A. A link 33 extends forwardly from the other arm of bellcrank 32 to a pin 34 carried on the end of a lever 35 which is pivotally mounted to wing structure by means not shown. Pin 34 pivotally supports two links 36 and 37 of equal length and of length equal to that of the lever 35. Pivotally mounted to wing structure is a bellcrank member 38 having one arm 39 connected to link 36 by means of a link 40 and the other arm 41 connected to link 37 by means of a link 42. Extending from the pivotal connection of links 37 and 42 is a link 43 which is pivotally connected to the arm 44 of the aileron cable quadrant 45 from which extend cables 46 and 47. Cables 46 and 47 pass over pulleys and connect to cable quadrants 48 associated with each aileron. Each cable quadrant 48 is provided with an arm 49 to which is pivotally connected a link 50 which in turn is pivotally connected to a crank 51 fixedly attached to the torque tube 52 upon which are carried the respective ailerons 20a and 20b.

Extending from the pivotal connection of links 36 and 40 is a link 53 which is pivotally connected to a lever 54, the other end of which is pivotally connected to a tie bar 55. The ends of the tie bar 55 are pivotally connected to arms 56 and 57 of propeller pitch quadrants 58 and 59 which are pivotally mounted upon a lever bar 60. Cables 61 and 62 extend from the propeller pitch quadrants 58 and 59 to the port and starboard propellers.

Each propeller is provided with variable pitch blades 63 carried by a hub 64 through which extends a rod 65 provided on one end with a cross bar member 66 to which are pivotally connected links 67 which in turn pivotally connect to pitch arms 68 provided on each blade 63. The other end of rod 65 is provided with a screw thread 69 which engages the threads of an associated nut member 70 around which are wrapped the cables 61 and 62 and which is supported against axial movement by a bracket 71 attached to wing structure.

A collective pitch lever 72 is journalled in bearings for rotation about a transverse axis while the lower extension thereof is connected by means of links 73a and 73b and a lever 74 to a lever 75 pivotally mounted on fuselage structure at 76. A lever 77, also pivotally mounted on fuselage structure at 76, pivotally supports a bellcrank 78. A link 79 connects lever 75 with one arm of bellcrank 78 while a link 80 connects the other arm of bellcrank 78 with a bellcrank 81 loosely supported on the wing tilt axis A—A. Link 82 extends forwardly from the other arm of the bellcrank 81 and is pivotally attached to one end of the lever bar 60. Links 83 and 84 are pivotally attached at their upper ends to wing structure forward of the wing tilt axis A—A and are pivotally attached at their lower ends to the forward ends of levers 28 and 77 respectively, the purpose of which will be hereinafter explained.

Loosely supported on the wing tilt axis A—A is a bellcrank 85, having one arm connected to fuselage structure at 27 by means of a link 86 and having its other arm connected by means of a link 87 to a lever 88 pivotally mounted on wing structure. The other end of lever 88 is connected to the pivotal connection of link 42 and arm 41 of bellcrank 38 by means of a link 89.

Still referring to Figs. 3A and 3B, wherein the control system is shown in the airplane flight position, it will be noted that the pivotal connection of links 36 and 40 and the pivotal connection of link 42 and arm 41 of bellcrank 38 are aligned with the pivotal axis of lever 35. In this position, movement of lever 35 about its pivotal axis causes no movement of link 40 and link 53 connected thereto, and lever 54 is thereby held in its neutral position. However, movement of lever 35 will cause movement of link 42 about its pivotal connection with arm 41 of bellcrank 38, and hence, movement of link 43 to thereby actuate the aileron cable quadrant 45. When the wing is tilted, by means not shown, to the dotted line position shown in Fig. 2 for hovering and vertical flight of the aircraft, the aileron-propeller pitch control changeover mechanism takes the position shown in Fig. 4 in the following manner.

Tilting of the wing about axis A—A results in rotation of the pivotal mounting of lever 88 about the axis A—A which, since the bellcrank 85 is held against rotation by link 86 and the pivotal connection of link 87 to bellcrank 85 does not move, causes a clockwise rotation of lever 88 about its pivotal axis which in turn through link 89 and its connection with arm 41 of bellcrank 38 causes a counterclockwise rotation of bellcrank 38 to the position shown in Fig. 4. In this position, the pivotal connection of links 37 and 42 and the pivotal connection of link 40 and arm 39 of bellcrank 38 are to the rear of the pivotal axis of lever 35 whereby movement of lever 35 will cause movement of link 40 about its pivotal connection with arm 39 of bellcrank 38 and hence, movement of link 53 to thereby actuate the lever 54 and through tie bar 55, the associated propeller pitch quadrants 58 and 59. In addition, since the pivotal connection of links 37 and 42 is not aligned with the pivotal axis of lever 35 but is to the rear thereof, movement of lever 35 will cause movement of link 42 about its pivotal connection with arm 41 of bellcrank 38 and hence, movement of link 43 to thereby actuate the aileron cable quadrant 45. This actuation, since the pivotal connection of links 37 and 42 is to the rear of the pivotal axis of lever 35 will be in a direction opposite to that obtained when the mechanism is in the airplane flight position shown in Fig. 3A and hence, results in reverse actuation of the ailerons or what may be termed aileron reversal.

The upward movement of links 83 and 84 during tilting of the wing about axis A—A, which causes clockwise rotation of levers 28 and 77, results in a downward shift of the bellcranks 29 and 78 which in turn causes clockwise rotation of the bellcranks 32 and 81. The length of the arm of lever 28 upon which the bellcrank 29 is pivotally mounted and the length of the arm of bellcrank 32 to which the link 31 is pivotally connected are so proportioned, and the point of attachment of the link 83 to wing structure is so located that the bellcrank 32 is rotated through the same angle that the wing is tilted whereby tilting of the wing does not cause movement of the lever 35 and any setting of the ailerons will be reflected in a differential pitch setting of the blades of the propellers 15 and 16 as the wing is tilted. Since, for efficient operation, a greater pitch of the propeller blades is required when acting as propulsion means than when acting as lifting means, the length of the arm of lever 77 upon which the bellcrank 78 is pivotally mounted and the length of the arm of bellcrank 81 to which the link 80 is pivotally connected are so proportioned, and the point of attachment of the link 84 to wing structure is so located that the bellcrank 81 is rotated through an angle less than that through which the wing is tilted. Accordingly, lever bar 60 is actuated in a direction to cause a decrease in pitch of the blades of both propellers as the wing is tilted to the vertical or hovering flight attitude and to cause an increase in pitch as the wing is tilted to the airplane flight attitude.

When the wing is in the airplane flight position, lateral movement of stick 21 to the right causes counterclockwise rotation of the bellcrank 24 which through link 25 causes clockwise rotation of lever 26 about the pin 27 which in turn causes clockwise rotation of the bellcrank 29 about its pivotal mounting upon the lever 28 thereby displacing the link 31 upwardly. This causes a forward displacement of the link 33 which in turn causes clockwise rotation of the lever 35 and through the links 37 and 42 movement of the link 43 to the right. This in turn causes counterclockwise rotation of the aileron cable quadrant 45 which through cables 46 and 47 causes counterclockwise rotation of the cable quadrants 48 to thereby raise the starboard aileron 20b and lower the port aileron 20a. Lateral movement of the stick 21 to the left results in the reverse motion of the ailerons.

Upward movement of the collective pitch lever 72, acting through lever 74 and links 73a and 73b causes counterclockwise rotation of lever 75 about its pivotal mounting 76, which in turn through link 79 and bellcrank 78 pivotally mounted upon lever 77 causes downward movement of link 80. This movement of link 80 causes clockwise rotation of bellcrank 81 about axis A—A which causes link 82 to move rearwardly. This motion causes a counterclockwise rotation of lever bar 60 which in turn results in a pull on the cables 61 and 62 attached to the quadrant 59 and a paying-out of the cables 61 and 62 attached to the quadrant 58. This in turn causes a rotation of the nut members 70 which through the rods 65 associated therewith results in an increase in pitch of the blades 63 of both propellers 15 and 16.

The operation of the controls during hovering and vertical flight will now be described. Lateral movement of stick 21 to the right again causes clockwise rotation of the lever 35 which, since the aileron-propeller pitch control changeover mechanism is in the position shown in Fig. 4, causes link 53 to move to the left. This in turn, through lever 54 and tie bar 55, causes a clockwise rotation of both propeller pitch quadrants 58 and 59 thereby causing a decrease in pitch of the blades of the starboard propeller 15 and an increase in pitch of the blades of the port propeller 16.

Clockwise rotation of lever 35 also causes link 43 to move to the left, which in turn causes clockwise rotation of the aileron cable quadrant 45. Through cables 46 and 47, the cable quadrants 48 are caused to rotate in a clockwise direction to thereby raise the port aileron 20a and lower the starboard aileron 20b. Thus, as the pitch of the blades of the port propeller 16 is increased, which results in increased airflow over that portion of the wing, and the pitch of the blades of the starboard propeller 15 is decreased, which results in decreased airflow over that portion of the wing, the ailerons are deflected in a direction to counteract any unbalance in the aerodynamic forces acting normal to the wing and thereby eliminate all tendencies of the aircraft to yaw during rolling maneuvers.

Movement of the collective pitch lever 72 results in a simultaneous increase or decrease in pitch of the blades 63 of both propellers 15 and 16 in the manner set forth hereinabove.

It will be appreciated that for positions of the wing between those for airplane flight and vertical or hovering flight, the changeover mechanism will be in a position in between that shown in Fig. 3A and that shown in Fig. 4. As the wing is tilted from the airplane flight position to the hovering or vertical flight position, the differential pitch control, i.e., increase in pitch of the blades of one propeller and a decrease in pitch of the blades of the other propeller, will "wash-in," while the aileron control will "wash-out" until such time as the wing reaches the position in which the pivotal connection of links 37 and 42 is aligned with the pivotal axis of the lever 35 whereby lateral movement of the stick 21 will cause no movement of the ailerons. Tilting of the wing beyond that position and to the position for hovering or vertical flight results in reverse actuation of the ailerons with lateral movement of the stick 21.

Although shown and described in what is believed to be the most practical and preferred embodiment, it is apparent that departures from the specific apparatus shown will suggest themselves to those skilled in the art and may be made without departing from the spirit and scope of the invention. I therefore do not wish to restrict myself to the particular form of construction illustrated and described, but desire to avail myself of all modifications that may fall within the scope of the appended claims.

Having thus described my invention, what I claim is:

1. In an aircraft, a wing pivotally mounted for tilting movement between positions for airplane flight and vertical flight, ailerons carried by said wing, variable pitch propellers mounted on said wing, a changeover mechanism operatively connected to said ailerons and to the pitch control of said propellers, a control member operatively connected to said changeover mechanism, and means responsive to tilting of said wing for positioning said changeover mechanism to provide for actuation of said ailerons in response to movement of said control member when said wing is in position for airplane flight and for positioning said changeover mechanism to provide for reverse actuation of said ailerons and for pitch change of said propellers in response to movement of said control member when said wing is in position for vertical flight.

2. In an aircraft, a wing pivotally mounted for tilting movement between positions for airplane flight and vertical flight, ailerons carried by said wing, a pilot's control member for actuating said ailerons, a changeover mechanism operatively positioned between said control member and said ailerons, aileron operator means attached to said ailerons and operatively connected to said changeover mechanism, positioning means connected to said changeover mechanism and responsive to tilting movement of said wing, without operative movement of said aileron operator, for positioning said changeover mechanism to provide for actuation of said ailerons in response to movement of said control member when said wing is in position for airplane flight and for positioning said changeover mechanism to provide for reverse actuation of said ailerons in response to movement of said control member when said wing is tilted to a position for vertical flight.

3. In an aircraft having a wing pivotally mounted thereon and provided with ailerons, the combination of thrust producing means mounted on said wing on both sides of said aircraft, means for controlling the thrust of said thrust producing means, a changeover mechanism operatively connected to said ailerons and to said thrust control means, a control member, means operatively connecting said control member to said changeover mechanism, and positioning means responsive to tilting movement of said wing from a position for airplane flight to a position for vertical flight for altering said changeover mechanism to provide for actuation of said ailerons in response to movement of said control member when said wing is in position for airplane flight and for altering said changeover mechanism to provide for reverse actuation of said ailerons and for actuation of said thrust controlling means in response to movement of said control member when said wing is in position for vertical flight.

References Cited in the file of this patent

UNITED STATES PATENTS 2,702,172    Focke ---------------- Feb. 15, 1955